F. F. GRANT.
SAFETY CLUTCH FOR STARTING EXPLOSIVE ENGINES.
APPLICATION FILED JAN. 2, 1917.
1,239,265.
Patented Sept. 4, 1917.
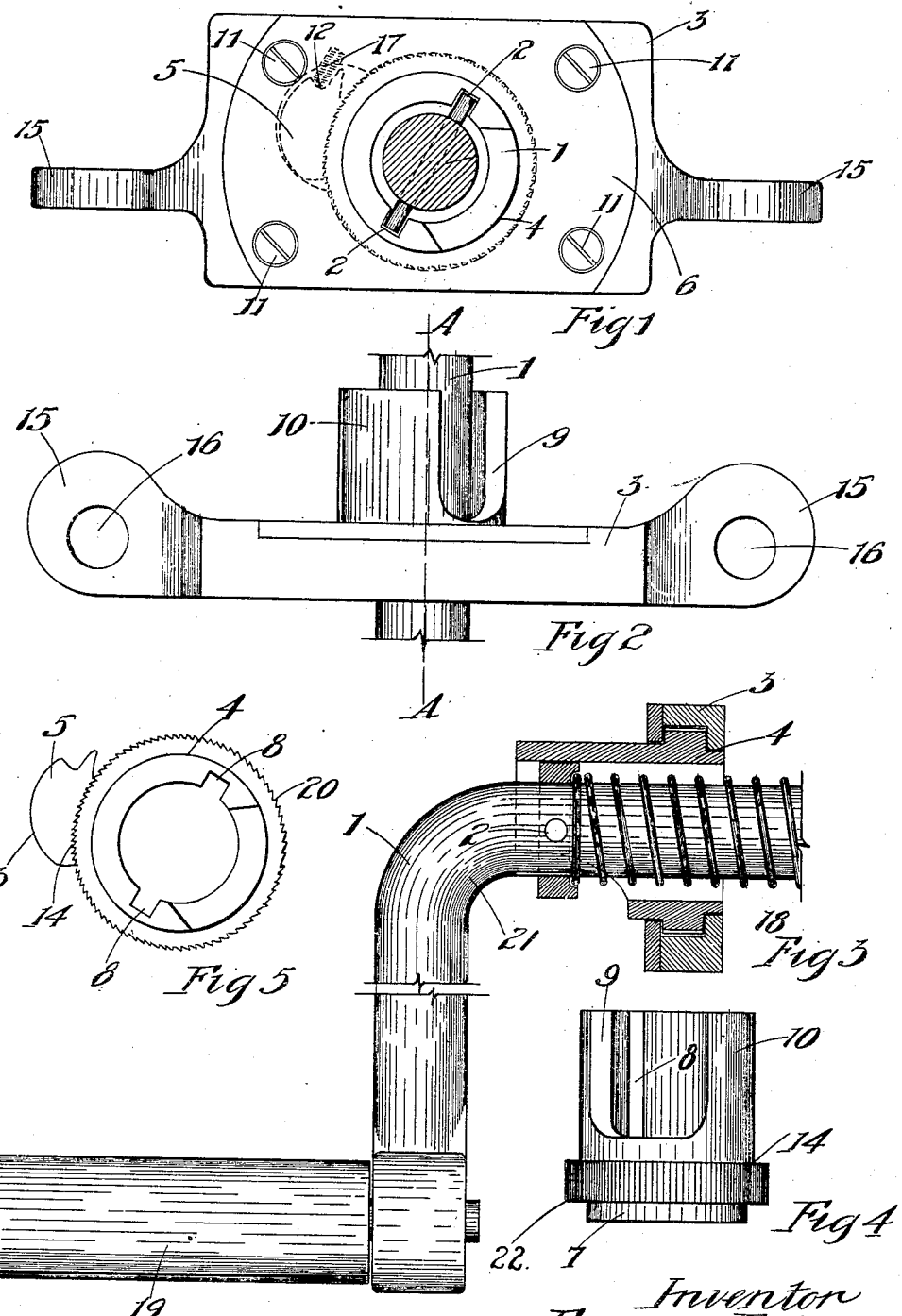

UNITED STATES PATENT OFFICE.

FRANKLIN F. GRANT, OF SAN DIEGO, CALIFORNIA.

SAFETY-CLUTCH FOR STARTING EXPLOSIVE-ENGINES.

1,239,265.  Specification of Letters Patent.  Patented Sept. 4, 1917.

Application filed January 2, 1917. Serial No. 140,043.

*To all whom it may concern:*

Be it known that I, FRANKLIN F. GRANT, a citizen of the United States, residing at San Diego, county of San Diego, State of California, have invented a new and useful Improvement in Safety-Clutches For Starting Explosive-Engines, of which the following is a specification.

My invention relates to improvements in starting devices for internal combustion engines, and the objects of my invention are, to provide a device that will prevent the engine from throwing the starting crank backward and thereby injuring the person using the crank, that it is simple of construction and can be easily attached to any vehicle or support of an engine of the class named.

In the description following, reference is had to the accompanying drawings in which, Figure 1 is a front view of my device showing in dotted lines the chamber in which the catch or dog is located; Fig. 2 is a top view of the device showing it in its relation to the crank shaft of an engine; Fig. 3 is a sectional view through A—A of Fig. 2 and the crank shaft of the engine, Fig. 4 is a detail view of the clutch member, and Fig. 5 is a detail view showing the front of the clutch member in Fig. 4 and the dog in its operative position thereto.

Similar characters of reference refer to similar parts throughout the different views.

Numeral 1 is the crank for turning an internal combustion engine and is provided with a number of lugs 2. The principal parts of my device are the casing 3, clutch 4, dog 5, and cover-plate 6. The clutch 4 is tubular in form and is intended to receive the crank 1 which reciprocates therein, and it is provided with an annular projection 22 having a toothed surface 20; it is also provided with an extended annular portion 7 and a plurality of grooves 8 and it is also provided with a large slot 9.

The casing 3 is provided near the center with a circular opening to receive the portion 7 of clutch 4, and the wall of casing 3 serves as a bearing for the clutch 4. The cover-plate 6 is provided with a circular opening to receive the portion 10 of the clutch 4 and the cover-plate 6 serves as a further bearing for the clutch 4. The cover-plate 6 is adapted to be securely attached to the casing 3 by being set in a recess in the casing 3 and bolted therein by the bolts 11. In a chamber 12 in the casing 3 there is provided a dog 5 having a plain curved edge 13 and a toothed curved edge 14. The casing 3 is also provided with lugs 15 in which there are holes 16. The holes 16 are adapted to receive bolts or screws for attaching the casing 3 to the vehicle operated by the internal combustion engine.

The chamber 12 in the casing 3 is semi-circular in form and is off-set from the central opening in said casing 3, and is of a sufficient size and depth to allow the dog 5 to move up and down freely therein. The dog 5 is placed in said chamber 12 with the toothed edge 14 resting against the toothed surface 20 of the clutch 4. A coil spring 17 is placed above the dog 5 in the chamber 12 and is adapted to press against the upper end of the dog 5 and force it downwardly, thus holding the teeth of said dog 5 in engagement with the teeth 20 of the clutch 4.

The crank 1 is provided with a coil spring 18 which is of a sufficient strength to hold the inner end of crank 1 out of engagement with the crank shaft of the engine to be operated, when the crank 1 is not being used to turn the crank shaft of the engine. The inner end of the crank shaft 1 may be connected to the crank shaft of the engine to be operated in any manner desired.

In operation the crank 1 is forced back through the clutch 4 until the end of the crank 1 is in engagement with the crank shaft of the engine to be started, and the shank 21 of the crank 1 will rest in the slot 9 and the lugs 2 of the crank 1 will engage with the clutch 4 and when the crank 1 is revolved by the use of the handle 19 in the direction to start the engine, the dog 5 will be forced upwardly compressing the spring 17 and thus allowing the crank to be revolved in the direction to start the engine.

In case the explosion in the engine should be such as to tend to force the engine to turn in the opposite direction to that desired, the dog 5 will drop down in the chamber 12 and the toothed surface of the dog 5 will engage with the teeth on the surface 20, thereby preventing the crank from being carried in the backward direction.

Having thus described my invention, what I claim as new and desire to secure by Letters Patent is,

1. In a device of the kind described, a casing having therein a central opening and a chamber off-set from said central opening, and a plurality of lugs for attaching it to a support, a cover-plate provided with a central opening mounted on said casing, means for attaching said cover-plate to said casing in a recess therein, a hollow clutch member revolubly mounted in said casing and said cover-plate, a dog for preventing the revolving of said clutch in one direction mounted in said off-set chamber in said casing, a crank provided with a plurality of lugs reciprocally mounted in said clutch in the grooves therein, a spring means mounted on said crank for holding it out of engagement, and a handle means for revolving said crank.

2. In a device of the kind described, the combination with a casing and a cover plate mounted on said casing and the starting crank of an internal combustion engine revolubly mounted in said casing, of a hollow clutch member having an annular projection provided with a toothed surface on its perimeter, a plurality of grooves in its inner wall adapted to engage with projections on said starting crank, a slot in its one end and a projecting bearing on its other end.

3. In a device of the kind described, the combination with a casing and a cover-plate mounted on said casing, and a clutch member having a toothed surface on its perimeter, of a dog provided with a curved toothed surface on one edge adapted to engage with the toothed surface on said clutch, and a plain curved surface on its other edge, mounted in a chamber in said casing in operative connection with said clutch member.

4. A device of the kind described, comprising a casing having a plurality of extending lugs, a central opening and an off-set chamber therein, a cover-plate having a central opening counter-sunk in said casing covering said off-set chamber in said casing, a hollow clutch member having an annular toothed projection and two bearing portions thereon, and a slot in one of said bearing portions, and a plurality of grooves in its inner surface, revolubly mounted in said casing and said cover-plate, a clutch stop member having a curved toothed surface and a curved plain surface mounted in said off-set chamber in said casing, a spring means mounted in said off-set chamber in operative connection with said stop member, a crank reciprocally mounted in said clutch member and adapted to revolve said clutch member wherein said lugs engage, and handle means to facilitate the revolution of said crank and means for connecting the inner end of said crank with the crank shaft of an internal explosion engine.

In testimony whereof I have hereunto subscribed my name in the presence of two subscribing witnesses.

FRANKLIN F. GRANT.

Witnesses:
E. E. RODABAUGH,
GEO. H. WOOD.

Copies of this patent may be obtained for five cents each, by addressing the "Commissioner of Patents, Washington, D. C."